United States Patent
Kong

[11] Patent Number: 5,832,020
[45] Date of Patent: Nov. 3, 1998

[54] SOLID-STATE LASER FORMING HIGHLY-REPETITIVE, HIGH-ENERGY AND HIGH-POWER LASER BEAM

[75] Inventor: Hong-Jin Kong, Taejon, Rep. of Korea

[73] Assignee: Korea Advanced Institute of Science and Technology, Taejon, Rep. of Korea

[21] Appl. No.: 673,640

[22] Filed: Jun. 25, 1996

[30] Foreign Application Priority Data

Jul. 28, 1995 [KR] Rep. of Korea ................... 1995 22849

[51] Int. Cl.$^6$ ....................................................... H01S 3/093
[52] U.S. Cl. ................................. 372/72; 372/70; 372/69; 372/27; 372/21; 372/22; 372/99
[58] Field of Search .................................. 372/21, 22, 23, 372/27, 39, 40, 68, 69, 70, 71, 72, 100, 106, 99; 359/333, 334, 338, 343, 345, 349

[56] References Cited

U.S. PATENT DOCUMENTS

| | | | |
|---|---|---|---|
| 4,734,911 | 3/1988 | Bruesselbach | 372/21 |
| 4,757,268 | 7/1988 | Abrams et al. | 372/21 X |
| 5,126,876 | 6/1992 | O'Meara | 359/338 |
| 5,208,699 | 5/1993 | Rockwell et al. | 359/338 |
| 5,557,431 | 9/1996 | Pepper | 359/10 |

OTHER PUBLICATIONS

David L. Carroll et al., Experimental Investigations of Stimulated Brillouin Scattering Beam Combiantino, J. Opt. Soc. Am. B, 9(12):2214–2224(1992).

D.A. Rockwell and C.R. Giuliano, Coherent Coupling of Laser Gain Media Using Phase Conjugation, Optics Letters, 11(3):147–149(1986).

*Primary Examiner*—Brian Healy
*Attorney, Agent, or Firm*—Darby & Darby, P.C.

[57] ABSTRACT

The present invention relates to a solid-state laser which forms a high-energy and high-power laser beam with a high repetition rate and whose overall system can be optically aligned in a simple manner. The solid-state laser of the invention can be fabricated by means of reflecting the laser beam which is reflected by a phase conjugation mirror (PCM) using stimulated Brillouin scattering(SBS) in a direction that is incidented on the PCM again, concurrently with the arrangement of directions of emission and incidence of the laser beam by the aid of polarization beam splitter(PBS).

8 Claims, 1 Drawing Sheet

SOLID-STATE LASER FORMING HIGHLY-REPETITIVE, HIGH-ENERGY AND HIGH-POWER LASER BEAM

FIELD OF THE INVENTION

The present invention relates to a solid-state laser which forms a high-energy and high-power laser beam with a high repetition rate and whose overall system can be optically aligned in a simple manner.

BACKGROUND OF THE INVENTION

A high-power solid-state laser such as $Nd^{+3}$: glass has been applied in the diverse fields such as laser material processing, X-ray lithography, X-ray microscope and nuclear fusion, etc. Naturally, studies on the solid-state laser have been actively carried out, and a high-power solid-state laser from which a high-energy and high-power laser beam can be formed by the amplification of laser beam emitted from a laser oscillator by employing an active laser medium and a stimulated Brillouin scattering(SBS) cell, has been suggested in the art(see: N. G. Basov et al., Sov. J. Quantum Electron, 11:819–823(1981); M. J. Damzen et al., J. Opt. Soc. Am., 152:120(1984)).

The high-power solid-state laser of prior art, however, has revealed a serious drawback that a high-energy and high-power laser beam can not be made with a high repetition rate, since thermal conductivity of laser amplification medium is so low that cooling of the medium is not accomplished sufficiently. Accordingly, the prior art solid-state laser has not been practically applied in industrial use.

On the other hand, it has been known that diameter of the laser amplification medium should be reduced to solve the problem of the prior art laser. In this case, however, the intensity of laser beam becomes larged and the amplification medium finally get damaged, if the diameter of the amplification medium is reduced below a critical value, and the overall system should be optically aligned in a complicated manner, when the change of flash lamp which is a light source for pumping, damaged optical components or amplification materials is necessary.

Under the circumstance, there are strong reasons for the development of a solid-state laser which can solve the problems in the art.

SUMMARY OF THE INVENTION

In accordance with the present invention, it has been discovered that: a solid-state laser which forms a high-energy and high-power laser beam with a high repetition rate and whose overall system can be optically aligned in a simple manner, can be fabricated by means of reflecting the laser beam which is reflected by a phase conjugation mirror (PCM) using stimulated Brillouin scattering(SBS) in a direction that is incidented on the PCM again, concurrently with the arrangement of directions of emission and incidence of the laser beam by the aid of polarization beam splitter(PBS), based on the recombination of laser beam emitted from a solid-state laser oscillator which is splitted in multiple beams and amplified.

A primary object of the present invention is, therefore, to provide a solid-state laser which forms a high-energy and high-power laser beam with a high repetition rate and whose overall system can be optically aligned in a simple manner.

BRIEF DESCRIPTION OF DRAWINGS

The above and the other objects and features of the present invention will become apparent from the following descriptions given in conjunction with the accompanying drawing, in which.

DETAILED DESCRIPTION OF THE INVENTION

Figure 1:
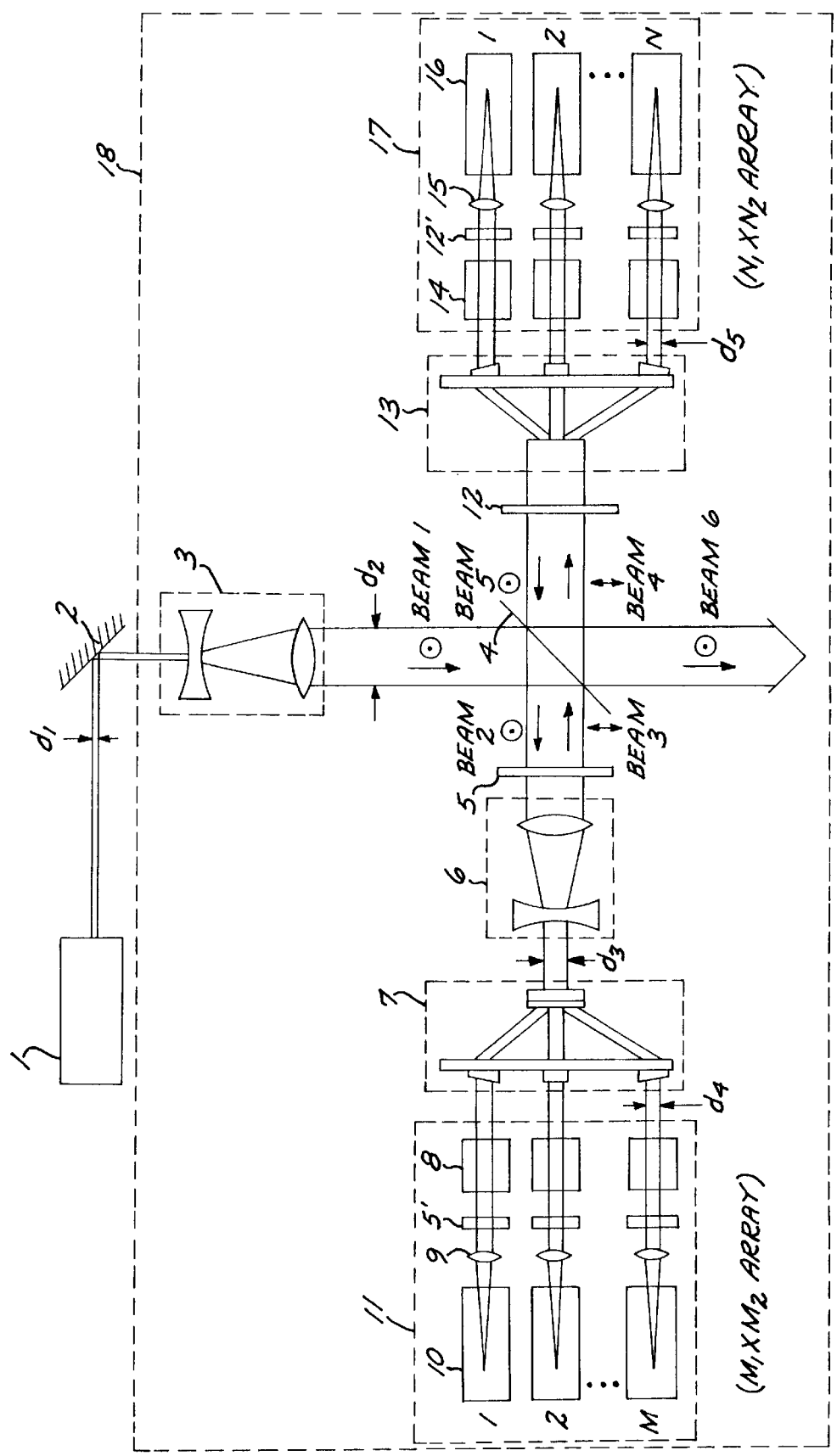
FIG. 1 is a schematic diagram showing a solid-state laser of the present invention.

A highly-repetitive, high-energy and high-power solid-state laser of the present invention comprises a series of laser amplification systems which comprise:

the first beam size expansion means for the expansion of laser beam size of linearly polarized light from a laser oscillator;

a polarization beam splitter for reflecting the laser beam whose size is expanded by the first beam size expansion means to the first laser amplification means;

the first linearly polarized light rotating means for making a linearly polarized light, which is reflected from the polarization beam splitter, of which polarization is rotated by 90° by double pass through it;

the first light splitting means for splitting laser beam in multiple beams, which is circularly polarized by the first linearly polarized light rotating means;

the first laser amplification means for the amplification of a laser beam splitted by the first light splitting means, comprising multiple of laser amplifiers arranging in a row, each of which comprises amp(rod or slab type), lens and stimulated Brillouin scattering cell acting as a phase conjugation mirror;

the second linearly polarized light rotating means for making a linearly polarized light, which is amplified by the first laser amplification means and passed through the polarization beam splitter, of which polarization is rotated by 90° by double pass through it;

the second light splitting means for splitting laser beam in multiple beams, which is circularly polarized by the second linearly polarized light rotating means; and, the second laser amplification means for the amplification of a laser beam splitted by the second light splitting means, comprising multiple of laser amplifiers arranging in a row, each of which comprises amp(rod or slab type), lens and stimulated Brillouin scattering cell acting as a phase conjugation mirror.

The highly-repetitive, high-energy and high-power solid-state laser of the invention may further comprise the second beam size expansion means for the rearrangement of size of laser beam reflected by the polarization beam splitter. At this moment, the first beam size expansion means and the second beam size expansion means may be constructed in a form of beam size expansion equipment comprising a concave lens and a convex lens, or in a form of spatial frequency filtering equipment comprising a couple of convex lenses.

Further, $\lambda/4$ plate, Rhomb prism and Faraday rotator, etc., can be employed as the first linearly polarized light rotating means and the second linearly polarized light rotating means, respectively, and the first linearly polarized light rotating means and the second linearly polarized light rotating means can be positioned before the first light splitting means and the second light splitting means or between the amp(rod or slab type) and stimulated Brillouin scattering cell of the first laser amplification means and the second laser amplification means. And, wedge-type beam splitter may be employed as the first light splitting means and the second light splitting means.

A preferred embodiment of the present invention is explained in detail with references of the accompanying drawing, which should not taken to limit the scope of the invention.

FIG. 1 is a schematic diagram showing a solid-state laser of the present invention.

As can be seen in FIG. 1, the solid-state laser of the invention comprises a series of laser amplification systems (18) which comprise: the first beam size expansion means(3) for the expansion of laser beam size of linearly polarized light from a laser oscillator(1); a polarization beam splitter (4) for reflecting the laser beam whose size is expanded by the first beam size expansion means(3) to the first laser amplification means(11); the first linearly polarized light rotating means(5) for making a linearly polarized light, which is reflected from the polarization beam splitter(4), of which polarization is rotated by 90° by double pass through it; the second beam size expansion means(6) for the expansion of laser beam size of reflected laser from the polarization beam splitter(4); the first light splitting means(7) for splitting laser beam whose laser beam size is modulated by the second beam size expansion means(6) in multiple beams; the first laser amplification means(11) for amplification of a laser beam splitted by the first light splitting means(7), consisting of multiple of laser amplifiers arranging in a row, each of which comprises amp(rod or slab type)(8), lens(9) and stimulated Brillouin scattering cell(10) acting as a phase conjugation mirror; the second linearly polarized light rotating means(12) for making a linearly polarized light, which is amplified by the first laser amplification means(11) and passed through the polarization beam splitter(4), of which polarization is rotated by 90° by double pass through it; the second light splitting means(13) for splitting laser beam which is a circularly polarized by the second linearly polarized light rotating means(12) in multiple beams; and, the second laser amplification means(17) for amplification of a laser beam splitted by the second light splitting means(13), consisting of multiple of laser amplification system(18) arranging in a row, each of which comprises amp(rod or slab type)(14), lens(15) and stimulated Brillouin scattering cell(16) acting as a phase conjugation mirror.

At this moment, the first beam size expansion means(3) and the second beam size expansion means(6) may be constructed in a form of beam size expansion equipment comprising a concave lens and a convex lens, or in a form of spatial frequency filtering equipment comprising a couple of convex lenses.

Further, λ/4 plate, Rhomb prism and Faraday rotator, etc., can be employed as the first linearly polarized light rotating means(5) and the second linearly polarized light rotating means(12), which can be positioned before the first light splitting means(7) and the second light splitting means(13) or between the amps(rod or slab type)(8,14) and the stimulated Brillouin scattering cells(10,16) of the first laser amplification means(11) and the second laser amplification means (17). And, wedge-type beam splitter may be employed as the first light splitting means(7) and the second light splitting means(13).

In the laser of the invention, a laser beam of good quality which is linearly polarized by a laser oscillator(1) and has a beam size $d_1$, is expanded by the first beam size expansion means(3) to have a beam size of $d_2$, and beam 1(direction of polarized light: ⊙) is reflected by a polarization beam splitter(4) to the first laser amplification means(11). On the other hand, beam 2(direction of polarized light: ⊙) which is reflected by the polarization beam splitter(4) is passed through the first linearly polarized light rotating means(5) to have a linearly polarized light which is rotated by 90°, where the first linearly polarized light rotating means(5') may be positioned between the amp(rod or slab type)(8) and the stimulated Brillouin scattering cell(10).

The circularly polarized laser beam is properly modulated by the second beam size expansion means(6) to have a beam size of $d_3$. As such, a laser beam which is incident on the first laser amplification means(11) may be modulated by the first beam size expansion means(3) and the second beam size expansion means(6), so that light intensity can be easily modulated in the laser of the invention.

The laser beam whose beam size is modulated by the second beam size expansion means(6), is splitted by the first light splitting means(7) in multiple beams each of which has a beam size of $d_4$, and the splitted laser beam is amplified by the first laser amplification means(11) consisting of multiple of laser amplifiers arranging in a row, each of which comprises amp(rod or slab type)(8), lens(9) and stimulated Brillouin scattering cell(10) acting as a phase conjugation mirror, where multiple of amplifiers may be connected in a row to have a random array of $M_1 \times M_2$. Both liquid and gas can be employed as media for the stimulated Brillouin scattering cell(10), and lens having a focal length which is proper for stimulated Brillouin scattering, can be employed as the lens(9).

Each of laser beam which is reflected from the stimulated Brillouin scattering cell(10) and amplified by the first laser amplification means(11) is passed through the first light splitting means(7) to be recombinded, amplified by the first beam size expansion means(6) to have a beam size of $d_2$ and make a linearly polarized laser beam 3(direction of polarized light: ↕) which is vertically polarized against the beginning by the first linearly polarized light rotating means(5). The laser beam 4(direction of polarized light: ↕) is passed through the polarization beam splitter(4) and the second linearly polarized light rotating means(12) to be circularly polarized, and splitted by the second light splitting means (13) in multiple beams each of which has a beam size of $d_5$ and the splitted laser beam is amplified by the second laser amplification means(17) consisting of multiple of laser amplifiers arranging in a row, which comprises amp(rod or slab type)(14), lens(15) and stimulated Brillouin scattering cell(16) acting as a phase conjugation mirror, where multiple of amplifiers may be connected in a row to have a random array of $N_1 \times N_2$ and the second linearly polarized light rotating means(12') may be positioned between the amp(rod or slab type)(14) and the stimulated Brillouin scattering cell(16).

Each of laser beam which is reflected by the stimulated Brillouin scattering cell(16) and amplified by the second laser amplification means(17), is passed through the second light splitting means(13) to be recombinded, and passed through the second linearly polarized light rotating means (12) to make a linearly polarized laser beam 5(direction of polarized light: ⊙) which is reflected by the polarization beam splitter(4) and the reflected laser beam 6(direction of polarized light: ⊙) is finally emitted outside, where the laser beam emitted from the laser amplification system(18) is amplified by multiple of laser amplification systems.

According to the laser of the invention, both of laser beam 1 from the laser oscillator(1) and laser beam 6 which is passed through the second laser amplification means(17) and emitted are propagated in the same direction, regardless of the angle of the polarization beam splitter(4), so that the laser beam 1 and 6 are propagated to have the same direction. The alignment can be made easily, since the direction of light propagation is not changed even in the case that the stimulated Brillouin scattering cell(10,16) is positioned randomly, which is grounded that laser beam is reflected again in a direction which is incident on the stimulated Brillouin scattering cell(10,16), regardless of the angle of the incidence, by the stimulated Brillouin scattering cell acting as a phase conjugative mirror in each of the laser amplification means(11,17). Accordingly, realignment which is necessary for the change of damaged amplification materials(10,16), flash light and the other optical components, which are components of the laser amplification means(11,17), can be simply carried out in the solid-state laser of the invention.

Further, photo-damage of the stimulated Brillouin scattering cell(10) is efficiently prohibited from the solid-state laser of the invention, while maximizing the reflectance of the stimulated Brillouin scattering cell(10), by modulating the beam size $d_3$ of laser beam incident on the first light splitting means(7), by the aid of the first beam size expansion means(3) and the second beam size expansion means (6).

The solid-state laser of the invention, by amplifying and recombining the splitted laser beam, which is distinct from the prior art solid-state laser employing a large-sized amplifier for the amplification of laser beam, can make high-power and high-energy laser beam with a high repetition rate at a small space, since cooling of the medium can be made sufficiently in advance of time required for cooling a laser rod or slab for amplification, even if a series of the laser amplification systems(18) are constructed therein.

As clearly illustrated as aboves, the solid-state laser of the invention can make a high-power and high-energy laser beam with a high repetition rate at a small space and its overall system can be optically aligned in a simple manner.

What is claimed is:

1. A highly-repetitive, high-energy and high-power solid-state laser comprising a series of laser amplification systems which comprise:

a first beam size expansion means for expanding the size of a laser beam of linearly polarized light from a laser oscillator;

a polarization beam splitter for reflecting said expanded laser beam to a first laser amplification means;

a first linearly polarized light rotating means for making a linearly polarized light, which is reflected from the polarization beam splitter, of which polarization is rotated by 90° by double pass through it;

a first light splitting means for splitting laser beams into multiple beams, which are circularly polarized by the first linearly polarized light rotating means;

a first laser amplification means for the amplification of a laser beam split by the first light splitting means, comprising multiples of laser amplifiers arranged in a row, each of which comprises an amplifier, a lens and a stimulated Brillouin scattering cell acting as a phase conjugation mirror;

a second linearly polarized light rotating means for making a linearly polarized light, which is amplified by the first laser amplification means and passed through the polarization beam splitter, of which polarization is rotated by 90° by double pass through it;

a second light splitting means for splitting the laser beam into multiple beams, which are circularly polarized by the second linearly polarized light rotating means; and a second laser amplification means for the amplification of a laser beam split by the second light splitting means, comprising multiples of laser amplifiers arranged in a row, each of which comprises an amplifier, a lens and a stimulated Brillouin scattering cell acting as a phase conjugation mirror.

2. The solid-state laser of claim 1 which further comprises a second beam size expansion means for the rearrangement of the size of the laser beam reflected by the polarization beam splitter.

3. The solid-state laser of claim 2 wherein the first beam size expansion means and the second beam size expansion means are constructed in a form of beam size expansion equipment comprising a concave lens and a convex lens, or in a form of spatial frequency filtering equipment comprising a couple of convex lenses.

4. The solid-state laser of claim 1 wherein the first linearly polarized light rotating means and the second linearly polarized light rotating means are selected from the group consisting of a $\lambda/4$ plate, a Rhomb prism and a Faraday rotator.

5. The solid-state laser of claim 1 wherein the first linearly polarized light rotating means is positioned before the first light splitting means and the second light splitting means or between the amplifier and the stimulated Brillouin scattering cell of the first laser amplification means.

6. The solid-state laser of claim 1 wherein the second linearly polarized light rotating means is positioned before the second light splitting means or between the amplifier and the stimulated Brillouin scattering cell of the second laser amplification means.

7. The solid-state laser of claim 1 wherein the first light splitting means and the second light splitting means comprise respective wedge-type beam splitters.

8. The solid-state laser of claim 1 wherein the amplifiers of the first and second amplification means are rod type or slab type.

* * * * *